(12) United States Patent
Han et al.

(10) Patent No.: US 11,472,157 B2
(45) Date of Patent: Oct. 18, 2022

(54) BIONIC FLEXIBLE ACTUATOR WITH REAL-TIME FEEDBACK FUNCTION AND PREPARATION METHOD THEREOF

(71) Applicant: JILIN UNIVERSITY, Jilin (CN)

(72) Inventors: Zhiwu Han, Changchun (CN); Linpeng Liu, Changchun (CN); Junqiu Zhang, Changchun (CN); Dakai Wang, Changchun (CN); Tao Sun, Changchun (CN); Kejun Wang, Changchun (CN); Shichao Niu, Changchun (CN); Tao Hou, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 346 days.

(21) Appl. No.: 16/771,193

(22) PCT Filed: Oct. 30, 2019

(86) PCT No.: PCT/CN2019/114399
§ 371 (c)(1),
(2) Date: Jun. 9, 2020

(87) PCT Pub. No.: WO2020/181790
PCT Pub. Date: Sep. 17, 2020

(65) Prior Publication Data
US 2021/0207939 A1    Jul. 8, 2021

(30) Foreign Application Priority Data

Mar. 8, 2019  (CN) .......................... 201910175771.7

(51) Int. Cl.
*B32B 9/00*       (2006.01)
*G01B 7/16*      (2006.01)

(52) U.S. Cl.
CPC ................ *B32B 9/007* (2013.01); *G01B 7/16* (2013.01)

(58) Field of Classification Search
None
See application file for complete search history.

(56) References Cited

U.S. PATENT DOCUMENTS 7,252,749 B2 *  8/2007  Zhou ...................... C25D 13/00
                                                                        204/485
2015/0248159 A1   9/2015  Luo et al.
(Continued)

FOREIGN PATENT DOCUMENTS

| CN | 105361977 A | 3/2016 |
| CN | 106783897 A | 5/2017 |

(Continued)

OTHER PUBLICATIONS

International Search Report dated Feb. 1, 2020 in corresponding International application No. PCT/CN2019/114399; 11 pages.

*Primary Examiner* — Hung K Vu
(74) *Attorney, Agent, or Firm* — Maier & Maier, PLLC

(57) ABSTRACT

A bionic flexible actuator with a real-time feedback function and a preparation method thereof. The method includes: preparing stimuli-response layer and bionic flexible strain-sensor film layer, arranging bionic V-shaped groove array structure on bionic flexible strain-sensor film layer, and sticking bionic flexible strain-sensor film layer onto stimuli-response layer through adhesive layer; stimuli-response layer is prepared by adopting following steps: mixing multi-walled carbon nanotubes and polyvinylidene fluoride after being dissolved in a solvent respectively and obtaining a mixed solution; performing a film formation process to mixed solution and embedding a first electrode to obtain stimuli-response layer. Due to sticking bionic flexible strain-sensor film layer onto stimuli-response layer, bionic flexible (Continued)

strain-sensor film layer can sense a deformation degree of stimuli-response layer through bionic V-shaped groove array structure, deformation of stimuli-response layer maybe be controlled by feedback of deformation information thereof.

15 Claims, 3 Drawing Sheets

(56) References Cited

U.S. PATENT DOCUMENTS

2015/0287978 A1\* 10/2015 Lockett .................... C09D 5/00
        252/502
2016/0333187 A1\* 11/2016 Bauer .................. C09D 201/00

FOREIGN PATENT DOCUMENTS

| CN | 106959071 A | 7/2017 |
| CN | 109405854 A | 3/2019 |
| CN | 109921679 A | 6/2019 |

\* cited by examiner

BIONIC FLEXIBLE ACTUATOR WITH REAL-TIME FEEDBACK FUNCTION AND PREPARATION METHOD THEREOF

CROSS-REFERENCES TO RELATED APPLICATIONS

This application is a national stage application of PCT Patent Application No. PCT/CN2019/114399, filed on Oct. 30, 2019, which claims priority to Chinese Patent Application No. 201910175771.7, filed on 3 Aug. 2019, the content of all of which is incorporated herein by reference.

FIELD

The present invention relates to the field of actuator, and more particularly, to a bionic flexible actuator with a real-time feedback function and a preparation method thereof.

BACKGROUND

An actuator in the prior art adopts mostly an actuation method of mechanical actuation, motor actuation, and hydraulic actuation. To achieve a controllable motion, a feedback in real-time to a response degree of a stimulus must be possessed, to further control a device anytime according to a feedback signal. In the prior art, the actuators all lack of a feedback system, being unable to achieve an intelligent controllable deformation.

Therefore, the current technology needs to be improved and developed.

SUMMARY

According to the above described defects, the purpose of the present invention is providing a bionic flexible actuator with a real-time feedback function and a preparation method thereof, in order to solve the problems in the prior art, that an actuator has no feedback function, unable to achieve an intelligent controllable deformation.

A technical solution of the present invention to solve the technical problems is as follows:

A preparation method of a bionic flexible actuator with a real-time feedback function, wherein comprising a plurality of following steps: preparing a stimuli-response layer and a bionic flexible strain-sensor film layer, arranging a bionic V-shaped groove array structure on the bionic flexible strain-sensor film layer, and sticking the bionic flexible strain-sensor film layer onto the stimuli-response layer through an adhesive layer;

preparing the stimuli-response layer by adopting a plurality of following steps:

dissolving multi-walled carbon nanotubes and polyvinylidene fluoride in solvent respectively before mixing to obtain a mixed solution;

performing a film formation process to the mixed solution and embedding a first electrode to obtain the stimuli-response layer.

The preparation method, wherein the bionic flexible strain-sensor film layer is prepared by adopting a plurality of following steps:

placing a cover made by polystyrene onto a container containing ethanol, then heating the ethanol and forming a V-shaped groove array on the cover to obtain a V-shaped groove array template;

preparing an anti-structure template by the V-shaped groove array template;

spin-coating a flexible material onto the anti-structure template, before performing a defoaming treatment and a heating treatment, and obtaining a flexible material layer after removing the anti-structure template;

forming a conductive layer by sputtering on the flexible material layer before connecting a second electrode, and obtaining the bionic flexible strain-sensor film layer.

The preparation method, wherein a thickness of the flexible material layer is 150-250 µm.

The preparation method, wherein the flexible material comprises at least one of polydimethylsiloxane, biaxially-oriented polypropylene, polypropylene, polyethylene, silicone rubber, fluorosilicone rubber, polymethyl methacrylate, polyethylene terephthalate, polyurethane, epoxy resin, polyethylene acrylate, polybutyl acrylate, polystyrene, polybutadiene, or polyacrylonitrile.

The preparation method, wherein the flexible material layer comprising: a flexible material and a hardener.

The preparation method, wherein a mass ratio of the flexible material to the hardener is 8-12:1.

The preparation method, wherein the conductive layer is made of at least one of following materials: carbon nanoparticle, gold nanoparticle, platinum nanoparticle, silver nanoparticle, and copper nanoparticle.

The preparation method, wherein the step of performing a film formation process to the mixed solution and embedding a first electrode to obtain the stimuli-response layer, comprising specifically:

defoaming the mixed solution in a vacuum incubator, pouring on a glass slide before scraping into a film and embedding a first electrode;

soaking the film scraped in water before drying and obtaining the stimuli-response layer.

The preparation method, wherein a thickness of the film scraped is 200-400 µm.

The preparation method, wherein a mass ratio of the multi-walled carbon nanotubes to the polyvinylidene fluoride is 3-7:100.

The preparation method, wherein before the step of dissolving multi-walled carbon nanotubes and polyvinylidene fluoride after in solvent respectively and mixing both solutions to obtain a mixed solution, further comprising:

drying the polyvinylidene fluoride in a vacuum box.

The preparation method, wherein the solvent is N, N-dimethylformamide.

The preparation method, wherein the adhesive layer is at least one of a light-curing glue or a heat-curing glue.

The preparation method, wherein a thermal expansion coefficient of the multi-walled carbon nanotubes and a thermal expansion coefficient of the polyvinylidene fluoride have a difference of 40 times.

A bionic flexible actuator with a real-time feedback function, wherein prepared by adopting the preparation method of the bionic flexible actuator with the real-time feedback function, comprising: a stimuli-response layer, an adhesive layer, and a bionic flexible strain-sensor film layer connecting successively.

Benefits: Due to sticking a bionic flexible strain-sensor film layer onto a stimuli-response layer, the bionic flexible strain-sensor film layer can sense a deformation degree of the stimuli-response layer through a bionic V-shaped groove array structure, the deformation of the stimuli-response layer maybe be controlled by a feedback of deformation information thereof.

DETAILED DESCRIPTION

In order to make the purpose, technical solution and the advantages of the present disclosure clearer and more explicit, further detailed descriptions of the present disclosure are stated herein, referencing to the attached drawings and some embodiments of the present disclosure. It should be understood that the detailed embodiments of the invention described here are used to explain the present invention only, instead of limiting the present disclosure.

Embodiment 1

Referencing to FIG. 1-FIG. 7 together, the present disclosure provides a plurality of embodiments of a preparation method of a bionic flexible actuator with a real-time feedback function.

Figure 1:
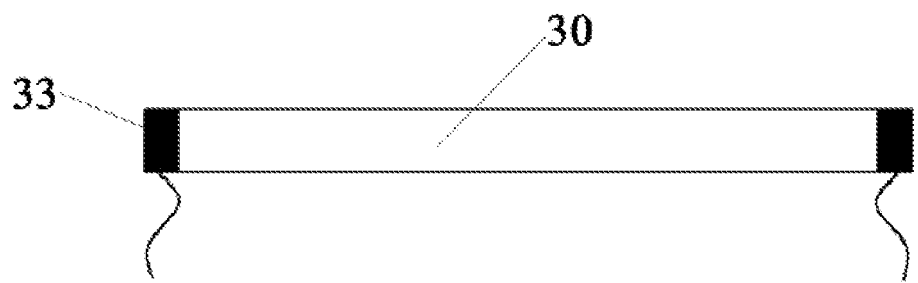
FIG. 1 illustrates a first structural schematic diagram of a bionic flexible actuator with a real-time feedback function in the present disclosure.
Figure 2:
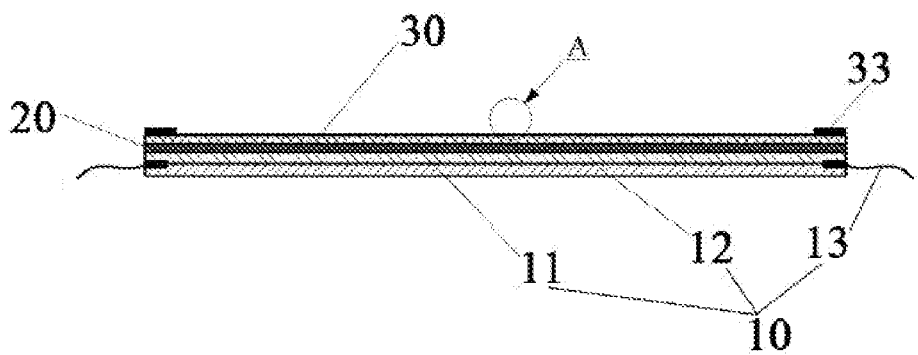
FIG. 2 illustrates a second structural schematic diagram of a bionic flexible actuator with a real-time feedback function in the present disclosure.
Figure 3:
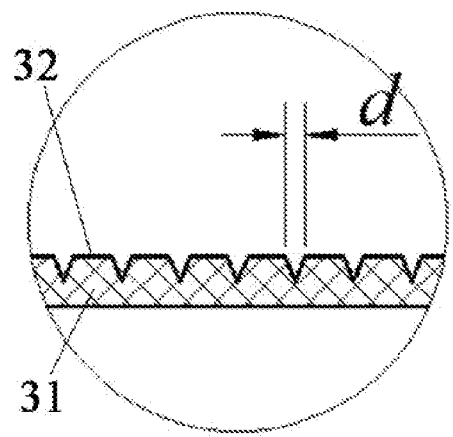
FIG. 3 illustrates an enlarged view at A in FIG. 2.

Shown as FIG. 1-FIG. 3, the preparation method of a bionic flexible actuator with a real-time feedback function in the present disclosure, comprises a plurality of following steps:

Step S100, preparing a stimuli-response layer 10 and a bionic flexible strain-sensor film layer 30, a bionic V-shaped groove array structure is arranged on the bionic flexible strain-sensor film layer 30.

The stimuli-response layer 10 in the present disclosure may be composed of a smart material or a thin film element composed of a plurality of other materials coupling together with an ability of stimuli-response and deformation. Wherein the smart material may be a plurality of materials, including a shape memory alloy (SMA), a hydrogel and more, having an intelligent property comprising perceiving a stimulus from an environment (including an internal environment and an external environment), analyzing, processing, and judging, before responding appropriately with a plurality of certain measures. Wherein the thin film element composed of a plurality of other materials coupling together with an ability of stimuli-response and deformation refers to a stimuli-response flexible film actuator element prepared by using a difference between a plurality of physical properties including a difference in a thermal expansion coefficient and a difference in hygroscopicity between different materials.

The present disclosure prepares a thermal-response film layer by adopting a difference between the thermal expansion coefficients in various materials, prepares the stimuli-response layer 10 by using the carbon nanotube and the polyvinylidene fluoride as raw material, since the thermal expansion coefficient of the carbon nanotube is $3 \times 10^{-6} K^{-1}$, and the thermal expansion coefficient of the polyvinylidene fluoride is $127.8 \times 10^{-6} K^{-1}$, a thermal expansion ability between two of them has a difference of 40 times.

The flexible strain-sensor film layer is prepared by imitating a super-sensitive sensing function of a scorpion in bionics. Using a plurality of receptors to sense a plurality of signals is a unique way for a creature. The receptors are usually coupled by a plurality of structures and materials, the structures have fine frameworks and the materials have rigidity and flexibility simultaneously. In nature, scorpion has a history of 430 million years of evolution. Due to a plurality of environmental pressures, the scorpion has gradually evolved into a nocturnal organism, and a habit of being active at night has led the scorpion to a highly degraded visual system. Lacking an ability of capturing and locating like most creatures of achieving an environmental signal imaging relying on a vision system has led the scorpion to evolve in a plurality of other directions, to complete a plurality of basic activities thereof, including a daily predation, an interspecific communication, and a courtship. Thus, a study has found that there is a slit receptor on their walking legs which makes the scorpion be able to rely on and realize a sensing localization of a vibration generated by an object around, and identify basic information of a vibration source according to a plurality of physical characteristics of a frequency and an amplitude of a vibration wave, thereby achieving a function of replacing the visual system. In addition, since most media which the scorpion lives in belong to a discontinuous substrate, for example, a desert scorpion lives in an environment full of sand, a rainforest scorpion lives in an environment with layers of fallen leaves, together with various noisy signals generated by other species living in the environment, making the ability of the scorpion of sensing and distinguishing a plurality of external signals through such receptors more sensitive. The flexible strain-sensor film layer is prepared by mimicking the slit receptor of the scorpion.

The step S100 comprises a plurality of following steps specifically:

Step S110, preparing a stimuli-response layer 10. Specifically comprising:

Step S111, placing the polyvinylidene fluoride in a vacuum box for a dry process.

Specifically, drying a powder of the polyvinylidene fluoride in a vacuum box at 100-120° C. for 3-5 hours, to remove moisture from the powder, so that the polyvinylidene fluoride may be fully dissolved and mixed with the multi-walled carbon nanotubes. Of course, it is also possible to perform a dry process to the multi-walled carbon nanotubes.

Step S112, mixing the multi-walled carbon nanotubes and the polyvinylidene fluoride after being dissolved in solvent respectively and obtaining a mixed solution.

After adding the multi-walled carbon nanotubes to the solvent, an ultrasonic dispersion is performed by an ultrasonic wave, and a specific time is 2 hours for the ultrasonic dispersion. The polyvinylidene fluoride is added to the solvent, getting stirred under heating to get fully dissolved. A heating temperature may be set as 50-70° C., and a method for the stirring may adopt a magnetic stirring.

In order to fully mix a solution of the multi-walled carbon nanotubes and a solution of the polyvinylidene fluoride, the solution of the multi-walled carbon nanotubes is added to the solution of the polyvinylidene fluoride and subjected to an ultrasonic treatment after being stirred under a heating condition. A heating temperature may be set as 50-70° C., with a stirring time of 3-5 h, and the stirring method may adopt the magnetic stirring, while the ultrasonic time is 1 h.

A mass ratio of the multi-walled carbon nanotubes to the polyvinylidene fluoride is 3-7:100. In the present embodiment, the solvent is N, N-dimethylformamide, of course, other solvents can also be used.

Step S113: performing a film formation process to the mixed solution and embedding a first electrode 13 to obtain the stimuli-response layer 10.

Specifically, performing a defoaming treatment to the mixed solution in a vacuum incubator first, before pouring the mixed solution onto a glass slide and scraping into a film, followed by embedding the first electrode 13; the film scraped is then soaked in water before dried, and the stimuli-response layer 10 is then obtained.

During the defoaming treatment, a temperature of the vacuum incubator is 25° C., and a defoaming time is 40-60 h. Two of the first electrodes 13 are set respectively on both ends of the film. The first electrode 13 may be inserted into the film before the film is fully cured, or may also be embedded in the film by placing the first electrode 13 onto the glass slide before the film is poured and scraped. A thickness of the film scraped is 200-400 μm. The film scraped is a flat sheet.

The flat sheet is placed in distilled water or deionized water and soaked for 60-80 hours at a room temperature, then dried in a constant-temperature drying oven at 50-70° C. for 7-9 hours. For the stimuli-response layer 10 final formed, the solvent inside would be completely evaporated, and the stimuli-response layer 10 is conductive due to an existence of the multi-walled carbon nanotubes. Since the multi-walled carbon nanotubes will settle under an action of gravity, the multi-walled carbon nanotubes in the flat sheet are not evenly distributed, instead, there are fewer multi-walled carbon nanotubes but more polyvinylidene fluoride in an upper layer (ie, a first layer 11), and more multi-walled carbon nanotubes but less polyvinylidene fluoride in a lower layer (ie, a second layer 12). Since each of them has a very different expansion coefficient, when the temperature rises, a degree of expansion of the upper layer is greater than that of the lower layer, causing the flat sheet protrude upward into a " ⌒ " shape.

Step S120, preparing the bionic flexible strain-sensor film layer 30. Specifically:

Step S121, placing a cover made by polystyrene onto a container containing ethanol, then heating the ethanol and forming a V-shaped groove array on the cover to obtain a V-shaped groove array template.

Specifically, a heating temperature for the ethanol is 80° C., and a heating time is 20-30 h. Due to a solvent induction method and a linear molecular chain characteristic of the polystyrene, a regular structure of a V-shaped groove array will appear on a surface of the cover made by polystyrene.

Step S122, preparing an anti-structure template by the V-shaped groove array template.

Specifically, the present disclosure adopts an epoxy resin AB glue to prepare the anti-structure template. The epoxy resin AB glue is mixed uniformly at a mass ratio of 3:1, before being put into the cover made by polystyrene, and vacuum defoamed by a vacuum box, with a defoaming time of 2 h, followed by being put in an oven for curing, with a curing temperature of 50° C. and a curing time of 7-9 h. After the epoxy AB glue is cured, the film (ie, the anti-structure template) formed after the epoxy resin AB glue is cured may be mechanically separated from the V-shaped groove array template, and the anti-structure template has a V-shaped bulge matching the V-shaped groove array.

Step S123, spin-coating a flexible material onto the anti-structure template, before performing a defoaming treatment and a heating treatment, and a flexible material layer 31 is obtained after removing the anti-structure template.

Specifically, the flexible material comprises at least one of polydimethylsiloxane, biaxially-oriented polypropylene, polypropylene, polyethylene, silicone rubber, fluorosilicone rubber, polymethyl methacrylate, polyethylene terephthalate, polyurethane, epoxy resin, polyethylene acrylate, polybutyl acrylate, polystyrene, polybutadiene, or polyacrylonitrile.

In order to accelerate curing the flexible material, a hardener is added into the flexible material. After the flexible material and the hardener is mixed at a mass ratio of 8-12:1, they are spin-coated onto the anti-structure template by a spin coater, specifically onto a face of the anti-structure template having the V-shaped bulge. Followed by a defoaming treatment and a heating treatment, a vacuum defoaming is adopted herein, with a heating temperature of 70-90° C., and a heating time of 3-5 h. And finally, the anti-structure template is removed mechanically. Since the anti-structure template has the V-shaped bulge, so the flexible material layer 31 has a structure of the V-shaped groove array consistent with the V-shaped groove array template. By controlling an adding amount of the flexible material, the flexible material layers 31 having different thicknesses may be obtained. In the present embodiment, a thickness of the flexible material layer 31 is 150-250 μm.

Step S124, forming a conductive layer 32 by sputtering on the flexible material layer 31 before connecting a second electrode, and obtaining a bionic flexible strain-sensor film layer 30. Since the flexible material layer 31 has a structure of the V-shaped groove array consistent with the V-shaped groove array template, the bionic flexible strain-sensor film layer 30 obtained after the conductive layer 32 is sputtered and formed also has a structure of a bionic V-shaped groove array.

Specifically, the conductive layer 32 is made of at least one of following materials: carbon nanoparticle, gold nanoparticle, platinum nanoparticle, silver nanoparticle, and copper nanoparticle. The conductive layer 32 may enhance a combination between the flexible material and the second electrode.

Step S200, sticking the bionic flexible strain-sensor film layer 30 onto the stimuli-response layer 10 through an adhesive layer 20. The adhesive layer is at least one of a light-curing glue and a heat-curing glue. Specifically, a polymer resin material, or an acrylate glue.

Specifically, a side of the flexible strain-sensor film layer having the bionic V-shaped groove array structure is arranged away from the stimuli-responsive layer 10. The flexible strain-sensor film layer may be arranged above or below the stimuli-responsive layer 10. In a case of the flexible strain-sensor film layer being arranged above the stimuli-responsive layer 10, when a temperature of the stimuli-responsive layer 10 rising, the degree of expansion of the upper layer is larger than the degree of expansion of the lower layer, thereby making the flexible strain-sensor film layer protrude upwards into a " ⌒ " shape, and a slit of the bionic V-shaped groove becomes larger. In a case of the flexible strain-sensor film layer being arranged below the stimuli-responsive layer 10, when a temperature of the stimuli-responsive layer 10 rising, the degree of expansion of the upper layer is larger than the degree of expansion of the lower layer, thereby making the flexible strain-sensor film layer protrude upwards into the " ⌒ " shape, and the slit of the bionic V-shaped groove becomes smaller.

Figure 4:
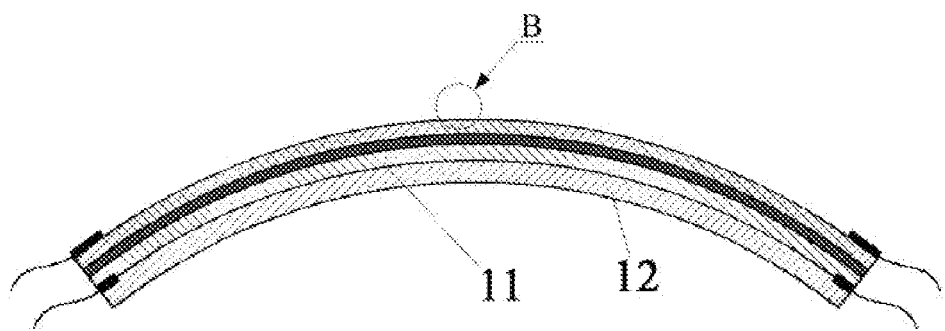
FIG. 4 illustrates a third structural schematic diagram of a bionic flexible actuator with a real-time feedback function in the present disclosure.
Figure 5:
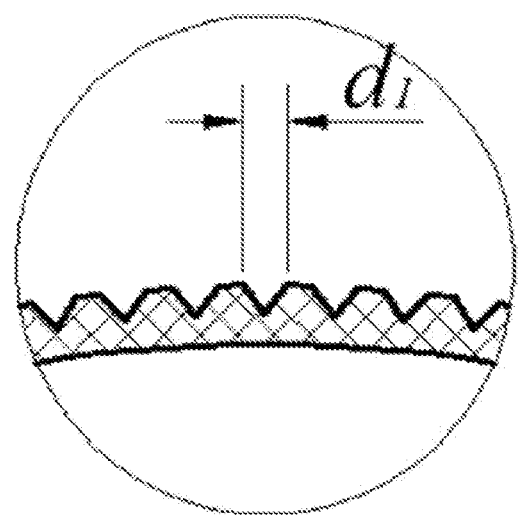
FIG. 5 illustrates an enlarged view at B in FIG. 4.
Figure 6:
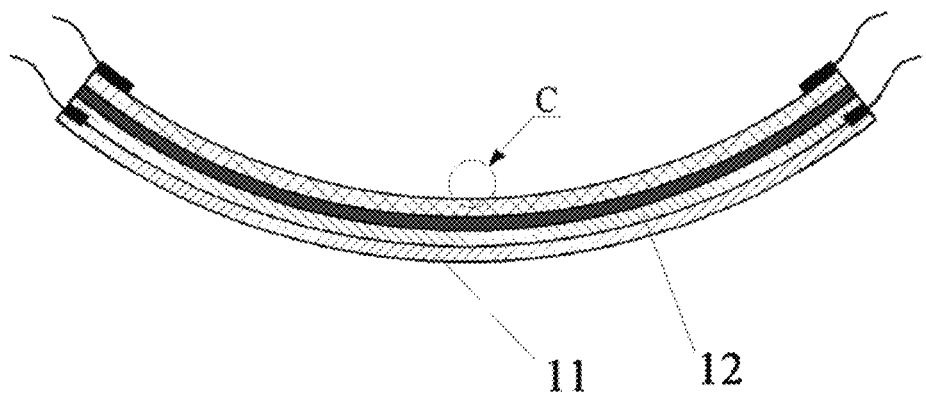
FIG. 6 illustrates a fourth structural schematic diagram of a bionic flexible actuator with a real-time feedback function in the present disclosure.
Figure 7:
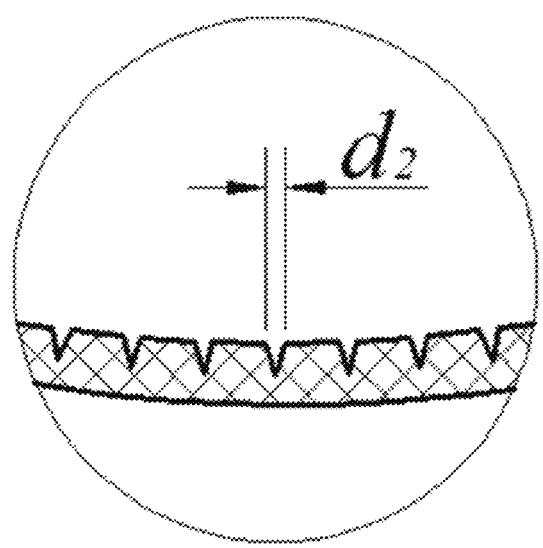
FIG. 7 illustrates an enlarged view at C in FIG. 6.

It is noted that, since a difference of the thermal expansion coefficient between the multi-walled carbon nanotubes and the polyvinylidene fluoride in the stimuli-response layer 10 is about 40 times, when a flexible actuator is not actuated, a structure of a surface state of the flexible strain-sensor film is shown as FIG. 3, wherein a distance between two walls of the bionic V-shaped groove is d. When the temperature in the environment rises, an expansion degree of the polyvinylidene fluoride film is higher than that of a film of the multi-walled carbon nanotubes, thus the stimuli-response layer 10 will bend with a bending direction always toward a side of the multi-walled carbon nanotubes. When a flexible sensor element is on a side of the polyvinylidene fluoride, since the film of the multi-walled carbon nanotubes is a conductor, when applying an appropriate voltage to the stimuli-response layer 10 through a wire, heat will be generated according to Joule effect, making the temperature of the stimuli-response layer 10 rises, inducing an actuation of bending, and causing a flexible strain-sensor element on a side of the polyvinylidene fluoride to deform. A schematic diagram of an effect of the actuation is shown in FIG. 4 and FIG. 5, and the distance of the slit between two walls of the bionic V-shaped groove on the sensor film changes (d1), before a resistance signal output changes, that is, realizing a feedback function. When the flexible sensor element is on a side of the multi-walled carbon nanotubes, the schematic diagram of the effect of the actuation is shown in FIG. 6 and FIG. 7. When the stimuli-response layer 10 is actuated by bending, the flexible strain-sensor element on the side of the multi-walled carbon nanotubes is driven to deform, and the distance of the slip between two walls of the bionic V-shaped groove on the sensor film changes (d2), before a resistance signal output changes, that is, realizing the feedback function. According to feedback information, it is possible to adjust a degree of actuating the stimuli-response layer 10 by bending to achieve an effect of a controllable deformation.

Embodiment 2

The present disclosure further provides an embodiment for the bionic flexible actuator with a real-time feedback function:

Shown as FIG. 2, the bionic flexible actuator with a real-time feedback function disclosed in the present embodiment, prepared by adopting any preparation method of the bionic flexible actuator with a real-time feedback function described above, comprises the stimuli-response layer 10, the adhesive layer 20, and the bionic flexible strain-sensor film layer 30 connecting successively.

All above, the present disclosure provides a bionic flexible actuator with a real-time feedback function and a preparation method thereof, the method comprising: preparing a stimuli-response layer and a bionic flexible strain-sensor film layer, arranging a bionic V-shaped groove array structure on the bionic flexible strain-sensor film layer, and sticking the bionic flexible strain-sensor film layer onto the stimuli-response layer through an adhesive layer; the stimuli-response layer is prepared by adopting a plurality of following steps: dissolving multi-walled carbon nanotubes and polyvinylidene fluoride in solvent respectively and mixing both solution to obtain a mixed solution; performing a film formation process to the mixed solution and embedding a first electrode to obtain the stimuli-response layer. Due to sticking a bionic flexible strain-sensor film layer onto a stimuli-response layer, the bionic flexible strain-sensor film layer can sense a deformation degree of the stimuli-response layer through a bionic V-shaped groove array structure, the deformation of the stimuli-response layer maybe be controlled by a feedback of deformation information thereof.

It should be understood that the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A preparation method of a bionic flexible actuator with a real-time feedback function, comprising:
   preparing a stimuli-response layer and a bionic flexible strain-sensor film layer, arranging a bionic V-shaped groove array structure on the bionic flexible strain-sensor film layer, and sticking the bionic flexible strain-sensor film layer onto the stimuli-response layer through an adhesive layer; and
   preparing the stimuli-response layer by:
   dissolving multi-walled carbon nanotubes and polyvinylidene fluoride in solvent respectively before mixing to obtain a mixed solution; and
   performing a film formation process to the mixed solution and embedding a first electrode to obtain the stimuli-response layer.

2. The preparation method according to claim 1, wherein the bionic flexible strain-sensor film layer is prepared by:
   placing a cover made by polystyrene onto a container containing ethanol, then heating the ethanol and forming a V-shaped groove array on the cover to obtain a V-shaped groove array template;
   preparing an anti-structure template by the V-shaped groove array template; spin-coating a flexible material onto the anti-structure template, before performing a defoaming treatment and a heating treatment, and obtaining a flexible material layer after removing the anti-structure template; and
   forming a conductive layer by sputtering on the flexible material layer before connecting a second electrode, and obtaining the bionic flexible strain-sensor film layer.

3. The preparation method according to claim 2, wherein a thickness of the flexible material layer is 150-250 µm.

4. The preparation method according to claim 2, wherein the flexible material is selected from the group consisting of polydimethylsiloxane, biaxially-oriented polypropylene, polypropylene, polyethylene, silicone rubber, fluorosilicone rubber, polymethyl methacrylate, polyethylene terephthalate, polyurethane, epoxy resin, polyethylene acrylate, polybutyl acrylate, polystyrene, polybutadiene, and polyacrylonitrile.

5. The preparation method according to claim 4, wherein the flexible material layer comprises a flexible material and a hardener.

6. The preparation method according to claim 5, wherein a mass ratio of the flexible material to the hardener is 8-12:1.

7. The preparation method according to claim 2, wherein the conductive layer is made of material selected from the group consisting of: carbon nanoparticle, gold nanoparticle, platinum nanoparticle, silver nanoparticle, and copper nanoparticle.

8. The preparation method according to claim 1, wherein performing a film formation process to the mixed solution and embedding a first electrode to obtain the stimuli-response layer, further comprises:
   defoaming the mixed solution in a vacuum incubator, pouring on a glass slide before scraping into a film and embedding a first electrode; and
   soaking the film scraped in water before drying and obtaining the stimuli-response layer.

9. The preparation method according to claim 1, wherein a thickness of the film scraped is 200-400 µm.

10. The preparation method according to claim 1, wherein a mass ratio of the multi-walled carbon nanotubes to the polyvinylidene fluoride is 3-7:100.

11. The preparation method according to claim 1, wherein before dissolving multi-walled carbon nanotubes and polyvinylidene fluoride in solvent respectively before mixing to obtain a mixed solution, the method comprises:

drying the polyvinylidene fluoride in a vacuum box.

12. The preparation method according to claim 1, wherein the solvent is N, N-dimethylformamide.

13. The preparation method according to claim 1, wherein the adhesive layer is selected from the group consisting of a light-curing glue and a heat-curing glue.

14. The preparation method according to claim 1, wherein a thermal expansion coefficient of the multi-walled carbon nanotubes and a thermal expansion coefficient of the polyvinylidene fluoride have a difference of 40 times.

15. A bionic flexible actuator with a real-time feedback function, prepared by adopting the preparation method of the bionic flexible actuator with the real-time feedback function according to claim 1, and further comprising: a stimuli-response layer, an adhesive layer, and a bionic flexible strain-sensor film layer connecting successively.

* * * * *